US010985938B2

(12) United States Patent
Krasadakis

(10) Patent No.: US 10,985,938 B2
(45) Date of Patent: Apr. 20, 2021

(54) SMART BUILDING VISUAL AND CONTEXTUAL TEAM IDENTIFICATION SYSTEM AND METHOD

(71) Applicant: Accenture Global Solutions Limited, Dublin (IE)

(72) Inventor: Georgios Krasadakis, Dublin (IE)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 391 days.

(21) Appl. No.: 15/865,654

(22) Filed: Jan. 9, 2018

(65) Prior Publication Data

US 2019/0215183 A1 Jul. 11, 2019

(51) Int. Cl.

| G06Q 10/00 | (2012.01) |
| H04L 12/28 | (2006.01) |
| G06K 9/00 | (2006.01) |
| H04W 4/38 | (2018.01) |
| G06Q 10/06 | (2012.01) |
| H04W 4/33 | (2018.01) |
| G06Q 10/10 | (2012.01) |

(52) U.S. Cl.
CPC ...... *H04L 12/2827* (2013.01); *G06K 9/00288* (2013.01); *G06K 9/00711* (2013.01); *G06Q 10/06313* (2013.01); *G06Q 10/1095* (2013.01); *H04W 4/33* (2018.02); *H04W 4/38* (2018.02)

(58) Field of Classification Search
None
See application file for complete search history.

(56) References Cited

U.S. PATENT DOCUMENTS

| 7,679,518 B1 | 3/2010 | Pabla et al. |
| 7,840,903 B1* | 11/2010 | Amidon ............. G06F 3/04815 |
| | | 715/757 |
| 9,239,627 B2 | 1/2016 | Kryze et al. |
| 9,710,793 B2 | 7/2017 | Hapse et al. |
| 2003/0103075 A1 | 6/2003 | Rosselot |
| 2011/0167357 A1 | 7/2011 | Benjamin et al. |
| 2014/0337080 A1 | 11/2014 | Jackson |
| 2017/0195411 A1* | 7/2017 | Mabey ................ H04L 65/4015 |
| 2017/0339216 A1* | 11/2017 | Carlos .................... H04L 67/06 |

* cited by examiner

Primary Examiner — Richard N Scheunemann
(74) Attorney, Agent, or Firm — Brinks Gilson & Lione

(57) ABSTRACT

A project team identification tool utilizes media components and sensors installed throughout a smart building, to detect individual persons and groups of people gathered together within the smart building. After detecting the people that are present within the smart building, the PTI tool references employee profile information to identify the detected people. The PTI tool is further configured to predict a project team the identified people belong to, as well as one or more projects associated with the predicted project teams. The PTI tool utilizes the advanced technology offered by the smart building to provide a unique solution for seamlessly identifying a project team of people meeting within the smart building.

17 Claims, 6 Drawing Sheets

610

| ID | Project name | Project status | Project team |
|---|---|---|---|
| 0001 | Project A | Active | {$E_1$, $E_2$, $E_5$, $E_9$, $E_{11}$, $E_{45}$, $E_{609}$, $E_{1235}$, $E_{1901}$} |
| 0002 | Project B | Completed | {$E_{11}$, $E_{50}$, $E_{91}$, $E_{110}$, $E_{145}$, $E_{609}$} |
| 0003 | Project C | Active | {$E_1$, $E_5$, $E_9$, $E_{11}$, $E_{15}$, $E_{19}$, $E_{45}$, $E_{141}$, $E_{415}$, $E_{609}$, $E_{1235}$, $E_{1901}$} |
| ...... | ...... | ...... | ...... |

620

| ID | Project name | Project status | Project team | Overlapping Members |
|---|---|---|---|---|
| 0001 | Project A | Active | {$E_1$, $E_2$, $E_5$, $E_9$, $E_{11}$, $E_{45}$, $E_{609}$, $E_{1235}$, $E_{1901}$} | 4/9=44.4% |
| 0002 | Project B | Completed | {$E_{11}$, $E_{50}$, $E_{91}$, $E_{110}$, $E_{145}$, $E_{609}$} | 1/9=11.1% |
| 0003 | Project C | Active | {$E_1$, $E_5$, $E_9$, $E_{11}$, $E_{15}$, $E_{19}$, $E_{45}$, $E_{141}$, $E_{415}$, $E_{609}$, $E_{1235}$, $E_{1901}$} | 4/12=33.3% |
| ...... | ...... | ...... | ...... | |

630

| ID | Project name | Project status | Project team | Overlapping Members |
|---|---|---|---|---|
| 0001 | Project A | Active | {$E_1$, $\cancel{E_2}$, $E_5$, $E_9$, $\cancel{E_{11}}$, $E_{45}$, $E_{609}$, $E_{1235}$, $E_{1901}$} | 4/7=57.1% |
| 0002 | Project B | Completed | {$\cancel{E_{11}}$, $\cancel{E_{50}}$, $\cancel{E_{91}}$, $\cancel{E_{110}}$, $\cancel{E_{145}}$, $E_{609}$} | 1/4=25.0% |
| 0003 | Project C | Active | {$E_1$, $E_5$, $E_9$, $\cancel{E_{11}}$, $\cancel{E_{15}}$, $\cancel{E_{19}}$, $E_{45}$, $\cancel{E_{141}}$, $\cancel{E_{415}}$, $E_{609}$, $E_{1235}$, $E_{1901}$} | 4/7=57.1% |
| ...... | ...... | ...... | ...... | ...... |
| | | | | |
| 0023 | Project FR | Active | {$E_5$, $E_9$, $\cancel{E_{11}}$, $\cancel{E_{15}}$, $\cancel{E_{19}}$, $E_{45}$, $\cancel{E_{141}}$, $\cancel{E_{415}}$, $E_{609}$, $E_{1235}$, $E_{1901}$} | 3/7=42.8% |

640

| ID | Project name | Project status | Project team | Adjusted Overlap |
|---|---|---|---|---|
| 0001 | Project A | Active | {$E_1$, $\cancel{E_2}$, $E_5$, $E_9$, $\cancel{E_{11}}$, $E_{45}$, $E_{609}$, $\cancel{E_{1235}}$, $\cancel{E_{1901}}$} | 4/5=80.0% |
| 0002 | Project B | Completed | {$\cancel{E_{11}}$, $\cancel{E_{50}}$, $\cancel{E_{91}}$, $\cancel{E_{110}}$, $\cancel{E_{145}}$, $E_{609}$} | 1/4=25.0% |
| 0003 | Project C | Active | {$E_1$, $E_5$, $E_9$, $\cancel{E_{11}}$, $\cancel{E_{15}}$, $\cancel{E_{19}}$, $E_{45}$, $\cancel{E_{141}}$, $\cancel{E_{415}}$, $E_{609}$, $\cancel{E_{1235}}$, $\cancel{E_{1901}}$} | 4/5=80.0% |
| ...... | ...... | ...... | ...... | |
| ...... | ...... | ...... | ...... | |
| 0023 | Project FR | Active | {$E_5$, $E_9$, $\cancel{E_{11}}$, $\cancel{E_{15}}$, $\cancel{E_{19}}$, $E_{45}$, $\cancel{E_{141}}$, $\cancel{E_{415}}$, $E_{609}$, $\cancel{E_{1235}}$, $\cancel{E_{1901}}$} | 3/5=60.0% |
| ...... | ...... | ...... | ...... | |
| ...... | ...... | ...... | ...... | |

Figure 6

SMART BUILDING VISUAL AND CONTEXTUAL TEAM IDENTIFICATION SYSTEM AND METHOD

TECHNICAL FIELD

This disclosure relates to a smart building that includes sensors and computing resources for accurately identifying a project team conducting a meeting in the smart building, and presenting the project team with relevant information related to their project.

BACKGROUND

Smart buildings include an installed network of sensors, information capturing devices (e.g., video cameras), and computing resources for operating building systems in a more efficient manner by automating certain tasks based on information obtained by the sensors. Smart buildings are also able to provide personalized interactions with users within the smart building based on recognizing individual users. It follows that the computing resources may provide advanced features such as facial recognition, smart learning controls of building systems to promote efficient utilization of the building systems, as well as predictive analysis to promote various automation features within the smart building.

As in any other building utilized for enterprise purposes, project teams of resources may gather in a smart building. Strategies for taking advantage of the installed layout of sensors and other connected devices within a smart building are disclosed for advancing efficiency and productivity of project teams running to accomplish enterprise projects within a smart building.

BRIEF DESCRIPTION OF THE DRAWINGS

FIG. 6 shows exemplary tables of project profile information and corresponding team member overlapping ratios.

DETAILED DESCRIPTION

Figure 1:
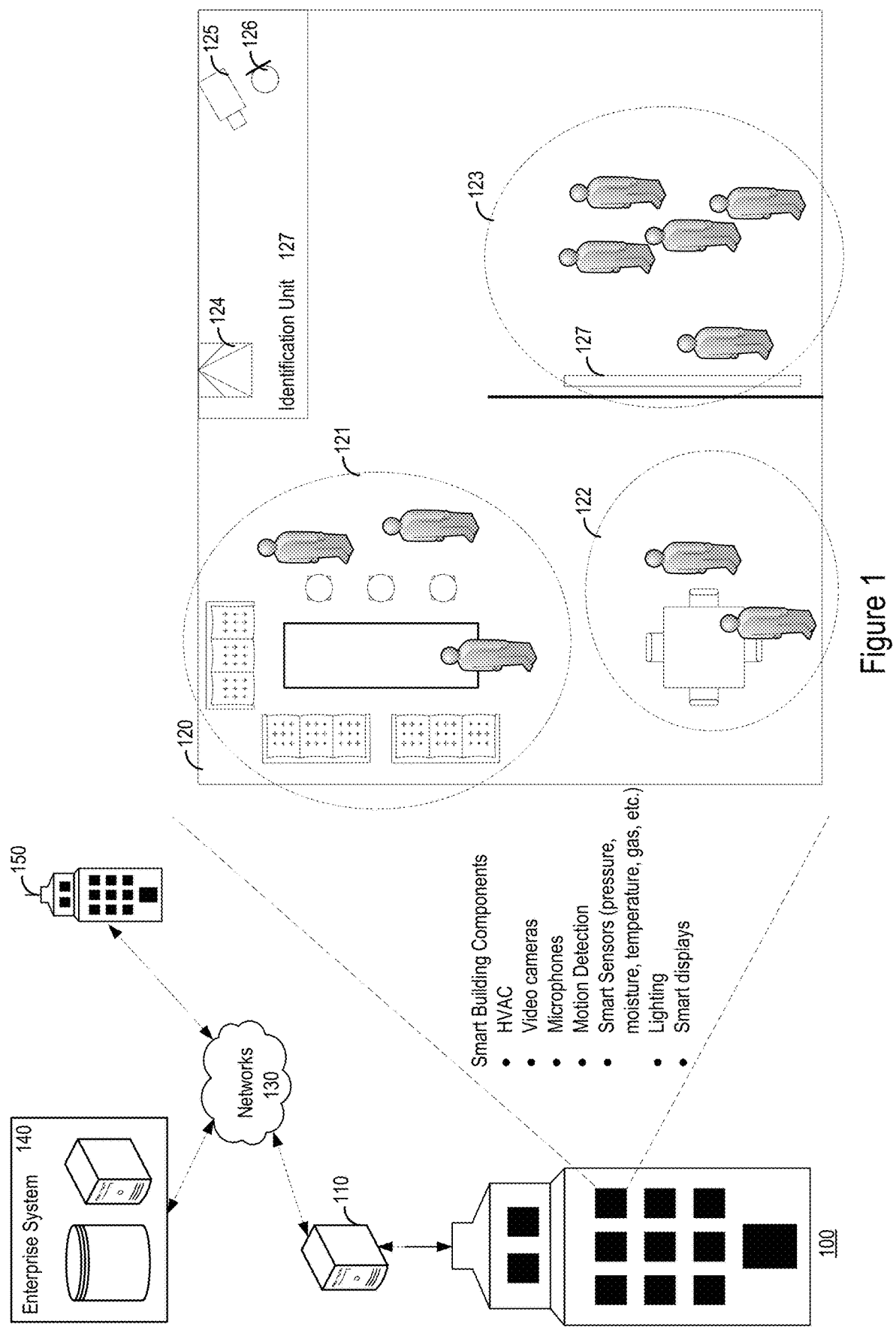
FIG. 1 shows an exemplary smart building system.

In order to take advantage of the benefits offered by a smart building, systems and methods are described that enable seamless identification of a project team comprised of occupants gathering within the smart building. The disclosure describes a project team identification tool (PTI tool) running on a computer device for managing, at least a part, of the smart building resources. The PTI tool may be comprised of software, hardware, and/or circuitry for implementing the features described herein. The PTI tool utilizes media components (e.g., video cameras, microphones) and sensors (e.g., motion sensors) installed throughout the smart building environment, to detect individual persons and groups of people gathered together within a specific area (e.g., meeting room, conference room, open space, or other defined area) in the smart building. After detecting the meeting event (that is, a gathering of people appearing to be together for a business meeting), the PTI tool references employee, or other known user, profile information to identify each of the detected people (constituting the gathering). The PTI tool is further configured to predict a project team the group of identified people belong to, as well as one or more projects associated with the predicted project teams. The PTI tool utilizes the advanced technology offered by the smart building to provide a unique solution for seamlessly identifying a project team of people meeting within the smart building, whether the meeting is previously scheduled (e.g., scheduled on a calendar system) or unscheduled (e.g., random ad-hoc meeting). Although reference is made to an employee throughout this disclosure, the employee may be representative of any person known, and/or identifiable, by a smart building. For example, a known user may include a contractor hired to be part of a project team to accomplish a specific project. The known user may also include a client agent to an enterprise organization, where the client agent is included on a project team to supervise and observe the other employee project team members.

An enterprise may include various predetermined groupings of people within its organization structure. For example, employees may be profiled into specific fixed teams according to their work function (e.g., accounting fixed team, human resources fixed team, finance fixed team, legal fixed team). Whereas the fixed team attribute is a long-term team, an employee may further be grouped into shorter term project teams. Project teams are comprised of a specific team of employees tasked with completing a specific project task for the enterprise. An employee may be included on one or more project teams at the same time.

A project team will often gather in groups to hold meetings within the smart building. To enhance efficiency and productivity of these meetings, the PTI tool tracks team members as they travel throughout the smart building, identifies when the team members are together as a group, and seamlessly presents fresh and relevant project materials to the team members and/or presentation devices that are being used. This technological improvement utilizes the smart components within the smart building to more efficiently (e.g., improved speed, data handling, and resource utilization, less or no interaction required) retrieve project materials and present them to team members when the team members are detected to be meeting.

FIG. 1 illustrates an exemplary smart building 100, including an area represented by a room layout 120 shown to include various groups of employees. The smart building 100 includes a central command computer 110 for running the PTI tool, where the central command computer 110 may be a representation of one or more computer devices located at the smart building. According to some embodiments, the central command computer 110 may be constructed, at least in part, to be included in a cloud computing system remote from the smart building 100. The central command computer 110 communicates with other remote computer resources such as an enterprise system 140 and another smart building 150, through a network 130. The enterprise system 140 may include content management systems, project repository system, human resources systems, building management systems, as well as other known systems that are included within an enterprise operation. The network 130 may be representative of one or more private, and/or public, networks defined over any pre-determined and possibly dynamic internet protocol (IP) address ranges.

The smart building 100 includes, for example, a plurality of smart building components such as HVAC (heating, ventilation, and air-conditioning) systems that are controlled based on feedback obtained from various smart sensors installed in the smart building 100. The smart building 100 also includes video cameras for capturing (e.g., recording and/or real-time streaming) occurrences within the smart building. Image recognition processes may be applied to the recorded video images to interpret information about the occurrences that are depicted in the recorded video images. The smart building 100 also includes microphones for capturing (e.g., recording and/or real-time streaming) sounds occurring in the smart building 100. Voice recognition processes (e.g., natural language processing) may be applied to the captured audio to recognize spoken language identified on the recorded audio. The smart building 100 also includes motion detectors for detecting movement and controlling systems within the smart building 100 (e.g., HVAC temperature settings) based on detected movement. The smart building 100 also includes various smart sensors for measuring characteristics within the smart building 100. The measured characteristics from the smart sensors are references to control various systems within the smart building to operate the smart building more efficiently. The smart building 100 also includes lighting controls that are controlled based on, for example, detected sensor measurements to be more efficient. The smart building also includes a network of connected, smart displays which can display content served by an integrated content management system (CMS) and according to an identified project team and its state.

Included in the room layout 120 is a motion detector 124, a video camera 125, and a microphone 126. The motion detector 124 may be an optical, microwave, or acoustic based sensor for detection movement within the room layout 120. The video camera 125 captures digital video of the room layout. The video camera 125 may also include depth/distance measuring components for measuring a distance between objects and/or mapping a three-dimensional image. The microphone 126 captures sounds occurring within the room layout. The motion detector 124, the video camera 125, and the microphone 126 may together comprise an identification unit 127. Based on information obtained from the identification unit 127, the PTI tool may detect three distinct groups of people within the room layout 120. A first group 121 includes three people, a second group 122 includes two people, and a third group 123 includes five people standing in front of a smart display 127. The PTI tool may apply the specific strategies described herein to determine which of these groups of people are predicted to be a project group, and select one or more projects associated with the predicted project group.

Figure 2:
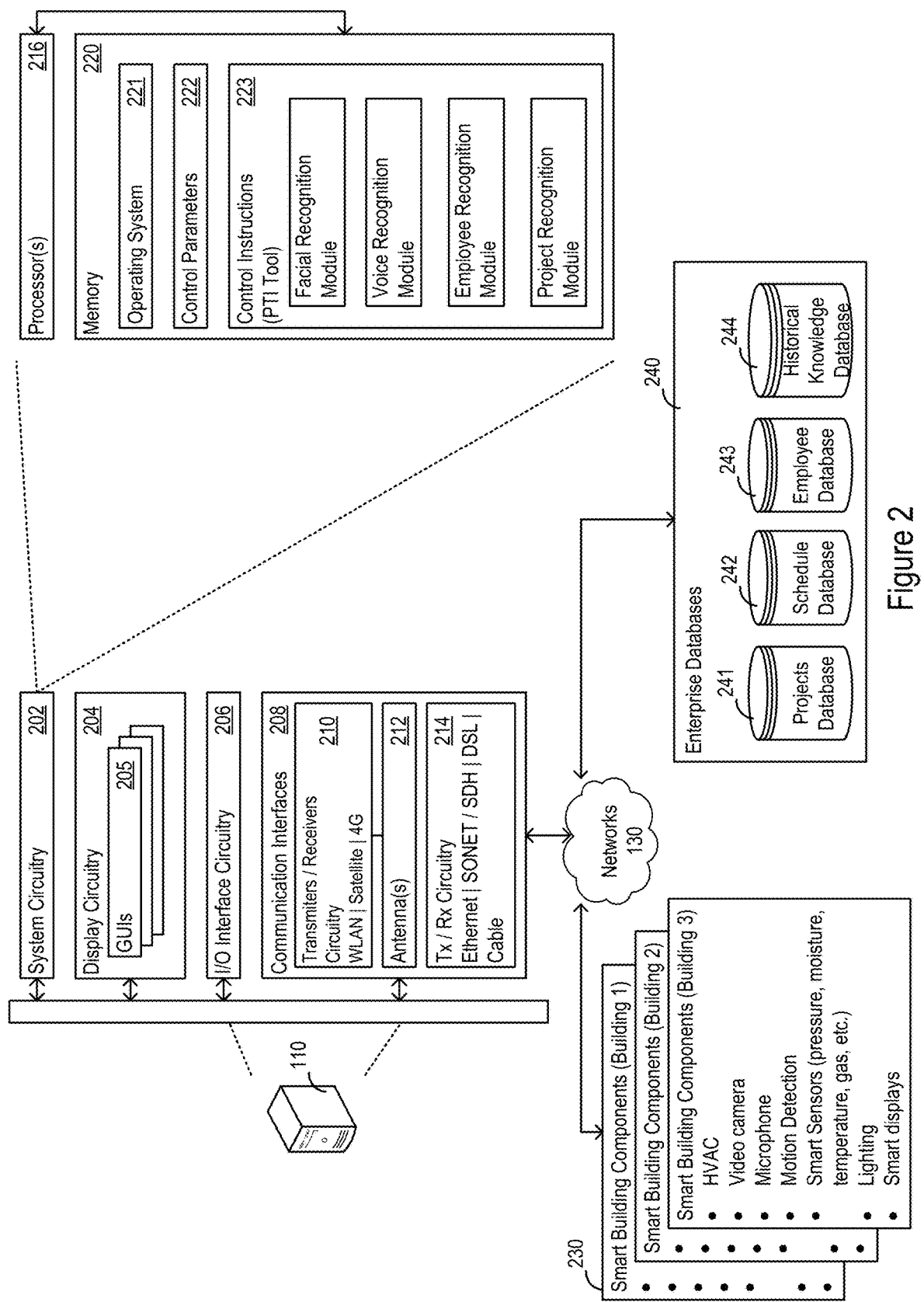
FIG. 2 shows an exemplary computer architecture for a central command computer for running a project team identification tool.

FIG. 2 illustrates an exemplary computer architecture for the central command computer 110 on which the PTI tool is executed. The central command computer 110 includes system circuitry 202, display circuitry 204, input/output (I/O) interface circuitry 206, and communication interfaces 208. The graphical user interfaces (GUIs) 205 displayed by the display circuitry 204 may be representative of GUIs generated by the PTI tool. The GUIs may be displayed locally using the display circuitry 204, or for remote visualization, e.g., as HTML, JavaScript, audio, and video output for a web browser running on a local or remote machine. Among other interface features, the GUIs 205 may render displays of the predicted project teams, predicted projects, and/or option for selecting between predicted project information, as described further herein.

The GUIs 205 and the I/O interface circuitry 206 may include touch sensitive displays, voice or facial recognition inputs, buttons, switches, speakers and other user interface elements. Additional examples of the I/O interface circuitry 206 includes microphones, video and still image cameras, headset and microphone input/output jacks, Universal Serial Bus (USB) connectors, memory card slots, and other types of inputs. The I/O interface circuitry 206 may further include magnetic or optical media interfaces (e.g., a CDROM or DVD drive), serial and parallel bus interfaces, and keyboard and mouse interfaces.

The communication interfaces 208 may include wireless transmitters and receivers ("transceivers") 210 and any antennas 212 used by the circuitry of the transceivers 210. The transceivers 210 and antennas 214 may support WiFi network communications, for instance, under any version of IEEE 802.11, e.g., 802.11n or 802.11ac, or other wireless protocols such as Bluetooth, Wi-Fi, WLAN, cellular (4G, LTE/A). The communication interfaces 208 may also include serial interfaces, such as universal serial bus (USB), serial ATA, IEEE 1394, lighting port, $I^2C$, slimBus, or other serial interfaces. The communication interfaces 208 may also include wireline transceivers 214 to support wired communication protocols. The wireline transceivers 214 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The communication interfaces 208 is shown to be in communication with other smart buildings through the network 130. Although three other smart buildings are shown to be in communication with the present smart building 100, the communication interfaces 208 enables the central command computer 110 to communicate with any number of other smart buildings. The communication interfaces 208 further enables the PTI tool running on the central command computer 110 to communicate with enterprise databases 240 through the network 130. The enterprise databases 240 includes a projects database 241 storing profile information on active, and in some embodiments also historical, enterprise projects that have assigned project teams of employees. Each project profile may include project attribute information. The project attribute information may include one or more of the following: project name, project description, critical dates, current status/state, meeting history, project sponsors, project manager(s), project team members, project team synthesis, as well as other project descriptive information. Each project profile may also include a topic signature for the projects, where the topic signature includes a storage of historical communications related to the project (e.g., emails related to the project, attachment documents to electronic correspondences related to the project, documents related to the project). The information included in the project profile (e.g., the topic signature alone or with other information in the project profile) may be utilized as a type of domain or dictionary of terms and documents that may later be referenced when analyzing a current project team meeting in the smart building 100.

The enterprise databases 240 also includes a schedule database 242 that includes the schedules for enterprise employees. The employee scheduling information may include information obtained from employee electronic calendar, as well as scheduling information such as paid time off and sick leave information obtained from human resources. The enterprise databases 240 also includes an employee database 243 that includes employee profiles describing employee attributes. The enterprise databases 240 also includes a historical knowledge database 244 that stores performance information from iterations of the PTI tool that may be referenced during subsequent iterations of the PTI tool to improve a performance of the PTI tool.

The system circuitry 202 may include any combination of hardware, software, firmware, or other circuitry. The system circuitry 202 may be implemented, for example, with one or more systems on a chip (SoC), application specific integrated circuits (ASIC), microprocessors, discrete analog and digital circuits, and other circuitry. The system circuitry 202 may implement any desired functionality of the PTI tool. As just one example, the system circuitry 202 may include one or more instruction processor 216 and memory 220.

The memory 220 stores, for example, control instructions 223 for executing the features of the PTI tool, as well as an operating system 221. In one implementation, the processor 216 executes the control instructions 223 and the operating system 221 to carry out any desired functionality for the PTI tool. For example, the control instructions 223 for the PTI tool includes a facial recognition module, a voice recognition module, an employee recognition module, and a project recognition module. Each module may include the instructional logic for implementing the associated recognition features of the PTI tool. The memory also includes control parameters 222 that provide and specify configuration and operating options for the control instructions 223, operating system 221, and other functionality of the central command computer 110.

Figure 3:
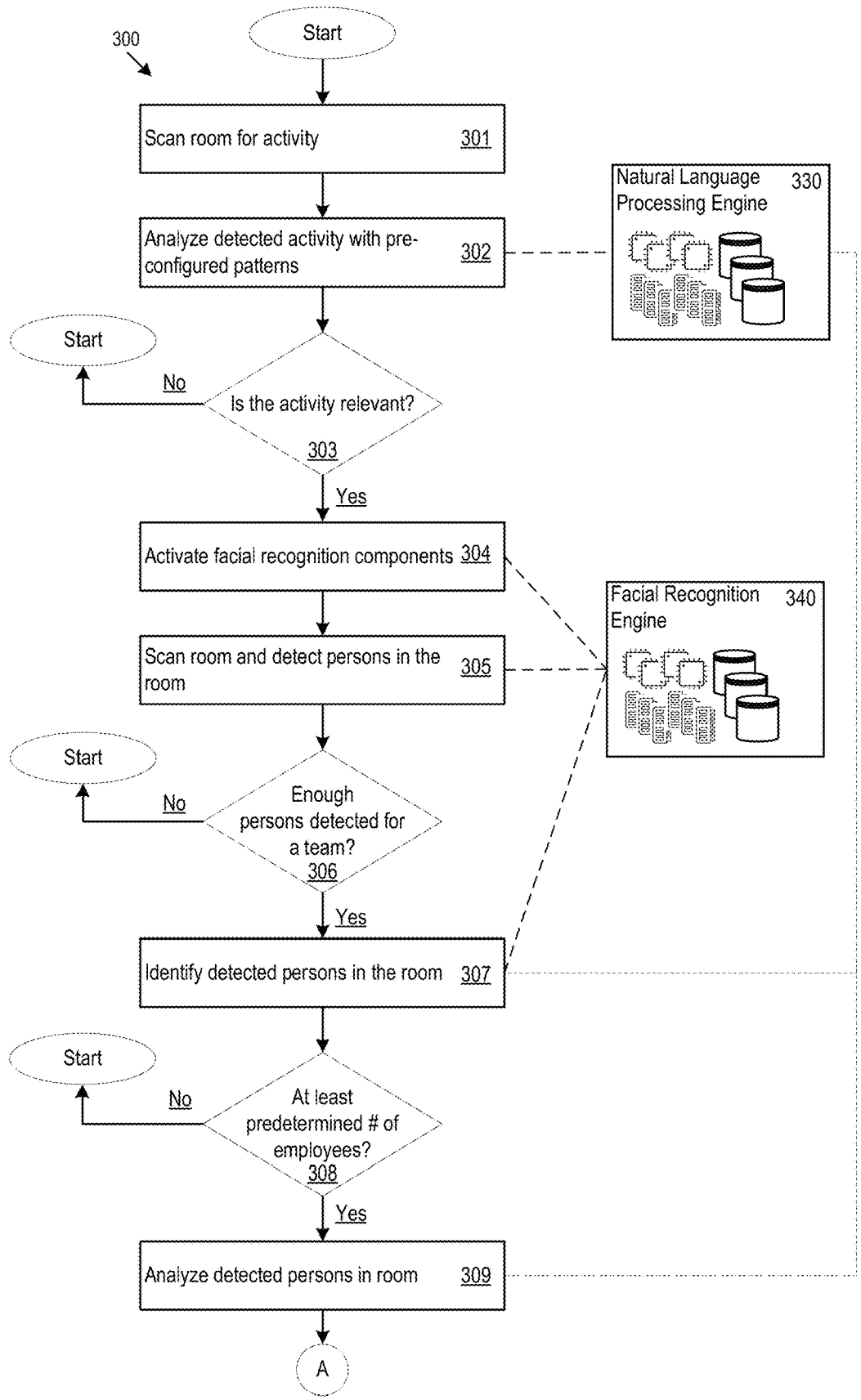
FIG. 3 shows an exemplary flow diagram of logic describing a process for predicting a project corresponding to an identified project team.

FIG. 3 illustrates a flow diagram 300 of logic describing a process implemented by the PTI tool for identifying a project team meeting within the smart building 100, and presenting the project team with a presentation of predicted project information. Exemplary embodiments will be described with reference to the room layout 120 from FIG. 1. The flow diagram 300 is continued onto FIGS. 4 and 5.

Initially, the PTI tool references sensors within the room layout 120 to detect activity that can be attributed to a presence within the room layout 120 (301). For example, the motion detector 124 may be referenced to determine whether a movement is detected in the room layout 120. If the motion detector 124 detects movement, this triggers the PTI tool to further investigate the activity. Other triggering events may be detected to determine an activity has occurred in the room layout 120. For example, the microphone may detect a sound from the room layout 120.

To further investigate the detected activity, the PTI tool compares the detected activity with known, pre-configured, patterns (302). The PTI tool then determines whether the detected activity is relevant for further processing based on the results of the comparison (303). For example, the movement detection may be compared against a pre-configured pattern that describes a relevant activity as a grouping of people (e.g., at least a predetermined number of people positioned within a predetermined distance from a next person in the proposed group), a movement lasting for a predetermined length of time, and/or a movement covering a predetermined distance. When an audio recording is being analyzed, the PTI tool may process the audio recording through a natural language processing (NLP) engine 330 to extract spoken words from the audio recording. The extracted words may then be compared against a pre-configured pattern of words to determine whether the activity is relevant.

When the detected activity is determined to not be a relevant activity, the flow diagram 300 returns to the start of the process. When the detected activity is determined to be a relevant activity, facial recognition components are activated (304). This includes the video camera 125, and a facial recognition engine 340. The PTI tool initiates a scan of the room layout 120 by controlling the video camera 125 to record a video recording of the room layout 120 (305).

The PTI tool runs the facial recognition engine 340 on the video recording to determine a grouping of people in the room layout 120, and a number of people in the grouping of people (306). When the PTI tool determines not enough people are detected in the grouping of people, the flow diagram 300 returns to the start of the process.

When the PTI tool determines enough people are detected in the grouping of people, the flow diagram 300 proceeds to identify the people in the detected group (307). For example, a predetermined number (e.g., four people) may determine whether enough people are included from the detected group. In this case, the third group 123 in the room layout 120 is the only detected group to include more than four people. When identifying the people in the detected group, the PTI tool applies the facial recognition engine 340 to the video images of the detected group to identify each detected person from the detected group (307). The facial recognition engine 340 may compare the faces detected from the video images of the detected group against employee headshots included in employee profiles stored on the employee database 243, and/or against other images of known employees processed from video images of other previously occurring meetings. The PTI tool may also apply the NLP engine 330 to compare voices captured in audio recordings of the room layout 120 against employee voice recordings included in employee profiles stored on the employee database 243, and/or against other audio files of voices of known employees processed from audio captured from other previously occurring meetings. The PTI tool may also reference real-time information captured from other information capturing devices (e.g., video cameras, microphones), to determine whether a person being considered to be the detected person from the detected group has been identified at another location within the smart building 100. If the person being considered is identified at another location within the smart building 100, the probability that they are the person being identified in the room layout 120 is low to none.

By applying the facial recognition engine 340 and the NLP engine 330, an identification, or non-identification, of each person included in the detected group is accomplished by the PTI tool. Each predicted identification of a person may be done with a calculated confidence level, such that the final prediction is a selection of an employee predicted to be the detected person with a highest confidence level considering all of the referenced factors. The identification of the people also confirms an employment status of the corresponding person. Any new information relied upon to identify employees may be stored as new employee identifying attributes in the employee's profile stored on the employee database 243, or stored on historical knowledge database 244 for subsequent reference when identifying employees.

After identifying the people from the detected group, the PTI tool determines whether at least a predetermined number of employees are identified from the detected group (308). By identifying at least the predetermined number of employees (as opposed to non-employees) from the detected group, the PTI tool is predicting with an acceptable level of confidence that the detected group is a project team for the enterprise. When the identified number of employees is less than the predetermined number of employees, the flow diagram 300 returns to the start of the process.

When the identified number of employees is greater than or equal to the predetermined number of employees, the PTI tool proceeds to further analyze the detected group (309). The detected group may be further analyzed to determine a positional arrangement of the people in the detected group, where certain predetermined arrangement of people are assigned a higher probability of being a project team (e.g., people seating around a conference table). The detected group may also be further analyzed to calculate the ratio of employees to non-employees, where a higher ratio of employees is assigned a higher probability of being a project team. The speech captured from the detected group may also be analyzed to determine a relevance to known project teams. For example, the NLP engine 330 may recognize specific terminology from the captured speech (e.g., industry-standard terminology, internal terms, or other key topic terms), and create a localized topic signature for the detected group. The PTI tool may then compare the localized topic signature with the topic signatures included in the project profiles stored on the projects database 241 to determine one or more projects sharing an overlap of information. A larger number of overlapping information may increase a relevance score for a project considered for matching to the detected group.

Figure 4:
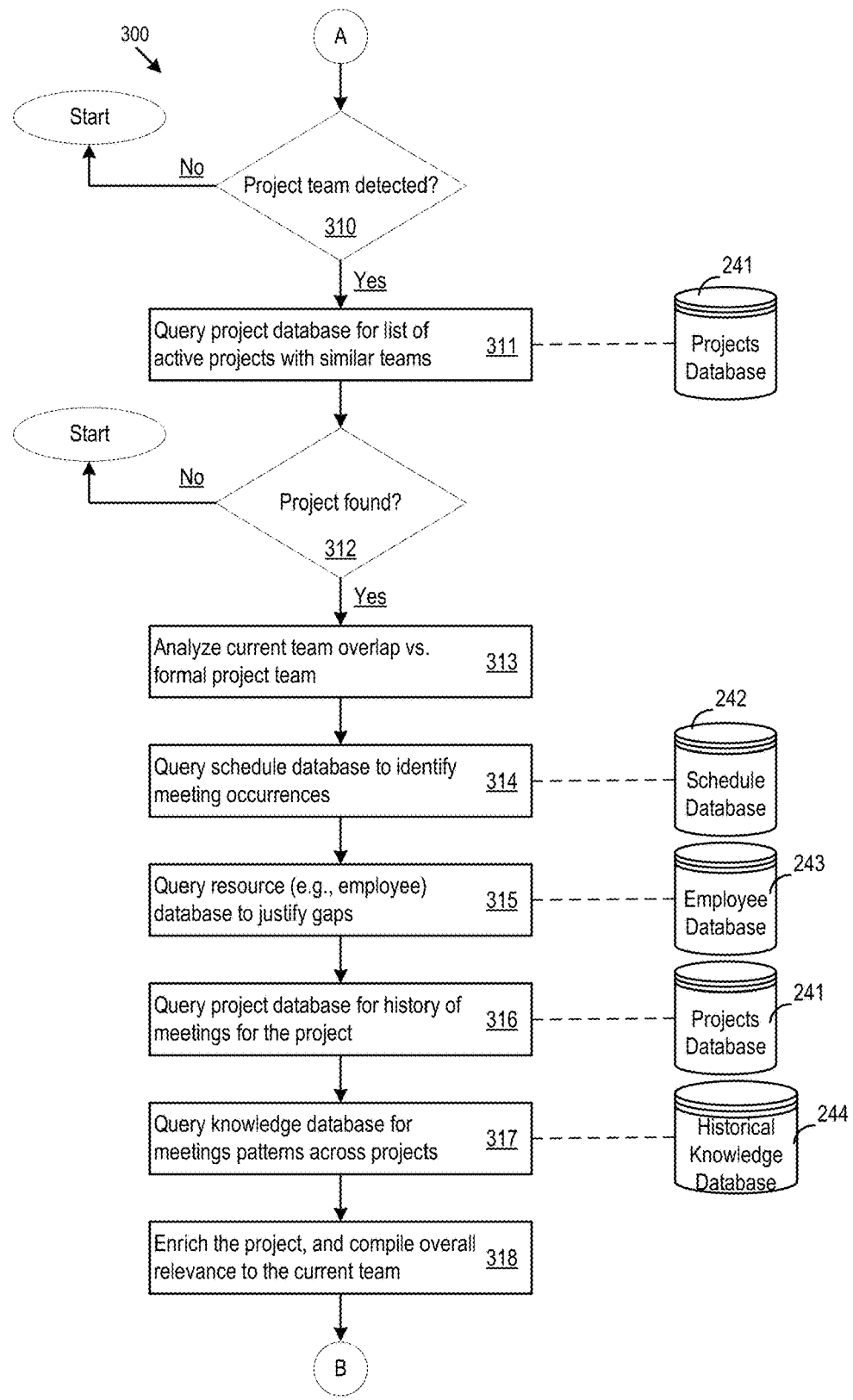
FIG. 4 shows a continuation of the exemplary flow diagram of logic from FIG. 3.
Figure 5:
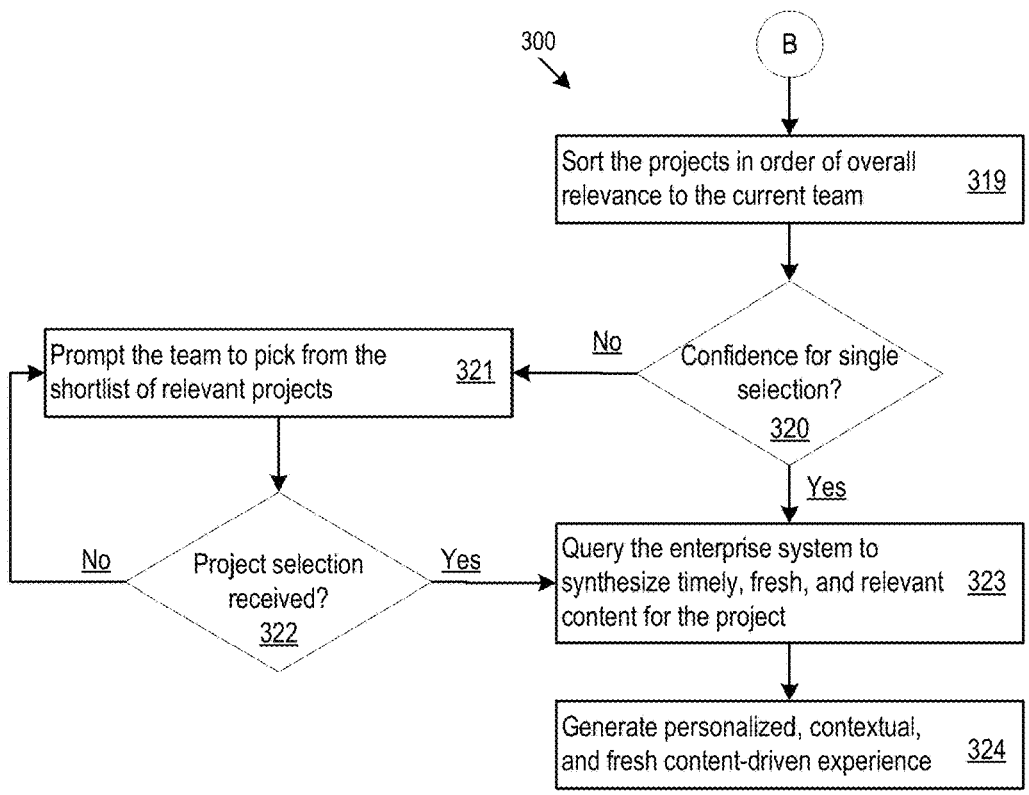
FIG. 5 shows a continuation of the exemplary flow diagram of logic from FIG. 3 and FIG. 4.

As continued in FIG. 4, the PTI tool determines whether the detected group is an actual project team assembled by the enterprise based, at least partly, on the further analysis (310). When the PTI tool determines the detected group is not an actual project team, the flow diagram 300 returns to the start of the process. However, when the PTI tool determines the detected group can be considered a project team, the PTI tool assigns the detected group to be the current project team that will be analyze for the remaining process of flow diagram 300.

The PTI tool queries the projects database 241 to select active projects described as being assigned to a project team comprised of team members comparable to the members identified in the current project team (311). When such projects are found, the PTI tool may return a shortlist of active projects from the projects database 241 that are assigned to a project team having at least some similarity to the current project team (e.g., minimum number of overlapping team members) (312). For example, projects from the projects database 241 being assigned to project teams sharing at least four out of the five same people as the current project team may be included in the shortlist returned by the PTI tool. The PTI tool may also consider the overlap of information from the comparison of topic signature to localized topic signatures from step (309), where projects having a larger relevance score from the comparison have a higher probability of being selected for the shortlist (e.g., top×predetermined number of projects with the highest relevance scores are included in the shortlist).

When projects that include team members having an acceptable level of similarity to the current project team cannot be found in the projects database 241 as reflected by an empty shortlist, the flow diagram 300 returns the process to the start. However, when at least one project that includes team members having an acceptable level of similarity to the current project team is found in the projects database 241 and included on the shortlist, the overlap of team members between the current project team and the projects selected onto the shortlist are analyzed (313). Missing team members, different team members, as well as extra team members are analyzed and considered for each of the projects on the shortlist. The more similar the project teams are to the current project team, the higher the relevance score for the corresponding project on the shortlist.

To further account for any differences, the PTI tool accesses the schedule database 242 to determine whether any of the projects included in the shortlist have scheduled team meeting times that overlap with the time and/or location the current project team was identified as having the meeting (314). When overlaps are found, the relevance score for the corresponding project on the shortlist is increased (e.g., the overlap in meeting times increases the probability the project being considered from the shortlist matches up to the current project team identified as having the meeting).

To further account for any differences, the PTI tool accesses the employee database 243 to determine whether any of the projects included in the shortlist have team members that are schedule to be out of the office (e.g., paid time off, holiday, sick leave, medical reason, jury duty) on the dates/times the current project team was recorded meeting (315). When the scheduled time offs are found to account for gaps from missing team members, the relevance score for the corresponding project on the shortlist is increased (e.g., the scheduled time off information indicates the missing team member is scheduled for time off, which accounts for why the missing team member was not present when the current project team was identified as having the meeting, so the missing team member should not adversely affect the prediction). The employee database 243 (or the schedule database 242) may further include a scheduling calendar for known users (e.g., employees). When the scheduling calendar accounts for the absence of certain missing team members, the relevance score for the corresponding project on the shortlist is increased (e.g., the scheduling calendar indicates the missing team member is scheduled to be at another meeting, which accounts for why the missing team member was not present when the current project team was identified as having the meeting, so the missing team member should not adversely affect the prediction).

To further account for any differences, the PTI tool accesses the projects database 241 to determine historical meeting times and places for the projects included on the shortlist, to identify overlaps with the time and/or location the current project team was recorded meeting (316). When overlaps are found, the relevance score for the corresponding project on the shortlist is increased.

To further account for any differences, the PTI tool accesses the historical knowledge database 244 to determine team meeting patterns based on the historical meeting times and places for the projects included on the shortlist, to identify overlaps with the time and/or location the current project team was recorded meeting (317). When overlaps are found, the relevance score for the corresponding project on the shortlist is increased.

The PTI tool updates an overall relevance score for each of the projects included on the shortlist in view of the considerations from steps (314-317), to determine their relevance to the current project team (318). The PTI tool sorts the projects included on the shortlist in an order of highest relevance to lowest relevance (319). Each of the projects on the shortlist are then analyzed to determine a confidence level for single selection that would present the project with the highest relevance score to the current project team (i.e., the third group 123) in the room layout 120 (320). For example, the confidence level may be calculated based on whether the highest rated project according to its relevance score exceeds a predetermined threshold. In addition to the relevance score, the confidence level may also consider other factors determined throughout the process described by flow diagram 300, such as the confidence level with which each detected person from the detected group was earlier identified.

When the determined confidence level exceeds the predetermined threshold, the project with the highest relevance score is presented directly to the current project team as a single selection (323). The project presentation may include timely, fresh, and/or relevant content for the project, as obtained from any one of the enterprise databases 240. The project presentation materials may be presented on the smart display 127 known to be in the vicinity of the detected third group 123.

However, when the confidence for single selection does not exceed the predetermined threshold, a selection GUI is first presented to the current project team to select a project from the shortlist (321). According to some embodiments, the selection GUI may be replaced, and/or supplemented by an audio UI that outputs voice requests, and receives voice commands from the current project team. After the selection input is received (322), the PTI tool proceeds with the presentation of the selected project (323). The presentation may further include personalized, contextual, and/or fresh content for the project (324).

In addition to the presentation of project content, the PTI tool may further control operation of one or more smart building systems based on the selected project from the shortlist. For example, the selected project may include a presentation having specific playback guidelines that require the lighting to be set to specific levels. Other systems such as the temperature setting and media controls (e.g., video recording) may also be controlled based on the selected project and/or identified team members from the current project team.

To illustrate the initial process for determining the overlap between the people in the detected group and known project groups at step (311), the following relationship algorithm is provided:

$$Overlap_{i,j} = \frac{\#(IEA_i \cap EPT_j)}{\#(PIA_i \cup EPT_j)} =$$

number of employees identified with confidence in the arrangement $i$ AND also are expected for project $j$
——————————————————————
distinct number of people in the Arrangement $i$ combined with the Effective Team for project $j$ Where:
  $IEA_i$, is the set of Identified Employees in Arrangement i
  $EPT_j$ is the Effective Project Team for project j—the members who could and should have joined the particular meeting
  $PIA_i$ is the set of People In the Arrangement i FIG. 6 shows a first table 610 including project profiles that may be representative of, for example, portions of the project profiles stored projects database 241. For each project profile, a project ID, project name, project status, and list of project team members is provided, wherein this exemplary scenario each team member is an employee. In other embodiments, a team member may include a non-employee. When the detected group of people in the room layout 120 is identified to include four employees $\{E_1, E_5, E_9, E_{609}\}$, this group is compared to the known project teams in the database 241, as identified, for example, in the first table 610. As only active projects are under consideration, Project B will not be considered due to its "completed" status.

Then the identified team members from the detected group, $\{E_1, E_5, E_9, E_{609}\}$, are compared to the active project teams, Project A and Project C, in the first table 610 to determine an overlap of team members. A second table 620 illustrates the resulting overlap from the comparison. The overlap of team members between the detected group, $\{E_1, E_5, E_9, E_{609}\}$, and Project A is 4/9 members=44.4%. The overlap of team members between the detected group, $\{E_1, E_5, E_9, E_{609}\}$, and Project C is 4/12 members=33.3%.

As described at step (315) above, the PTI tool may access the employee database 243 to determine scheduled time off for employees. So, if the PTI tool determines that employees $\{E_{11}, E_{15}, E_{19}, E_{45}, E_{141}, E_415\}$ are currently out of office due to, for example, paid time off, the PTI tool removes these employees from the list of employees in each project team that are available for consideration. For example, Project A includes employees $E_{11}$ and $E_{45}$ that are now known to be out of the office, and therefore these two employees are excused from consideration from Project A, which results in the more accurate overlap calculation of 4/7=57.1%. For Project C, this new information on employees that are known to be out of the office results in six employees being removed from consideration in Project C, and the overlap comparison is updated to be 4/6=66.6%. So by referencing additional information related to known employees that are out of the office, the PTI tool is able to make a more accurate assessment and adjust the relevance scores accordingly. Based on the additional information related to known employees that are out of the office, now Project C becomes the most probable project for the detected group, $\{E_1, E_5, E_9, E_{609}\}$.

According to another exemplary scenario, the PTI tool may determine that the detected group in the room layout 120 is attending a monthly leadership meeting based on context determined from NLP applied to captured voice from the detected group, which may be further supplemented by employee profile information identifying the detected group, $\{E_1, E_5, E_9, E_{609}\}$, as being employees having an employee status eligible for attending the monthly leadership meeting. By recognizing the monthly leadership is occurring, materials for the monthly leadership meeting may be presented, for example, on the smart display 127 without prompting from any of the group members.

Recognizing the monthly leadership is occurring also allows the PTI tool to remove (i.e., excuse) non-leadership level employees from being present, which may result in a fewer number of eligible team members for consideration. Consider a third table 630 illustrating a scenario where $\{E_1, E_5, E_9, E_{609}, E_{45}, E_{1235}, E_{1901}\}$ are recognized to be leadership level employees, while the remaining employees are recognized not to be leadership level employees. Then, for Project A the PTI tool still identifies four overlapping team members with the detected group, $\{E_1, E_5, E_9, E_{609}\}$, but instead of counting nine total eligible team members in Project A, the PTI tool only counts seven because the PTI tool recognizes that $E_{1235}$ and $E_{1901}$ are not leadership level employees and would not be in the meeting anyways. Therefore, the adjusted overlap ratio become 4/7=57.1%. By the same adjustment, the PTI tool adjusts the overlapping ratio for Project FR to 3/7=42.8%.

The overlap ratio may be further adjusted in view of additional relevant information obtained by the PTI tool from the smart building 100 that accounts for additional missing employees from the detected group. For example, a fourth table 640 reflects a scenario where the PTI tool obtains information that employees $E_{1235}$ and $E_{1901}$ are detected by the smart building 100 to be sitting in another meeting, and thus could not physically join the current detected group, employees $E_{1235}$ and $E_{1901}$ may be removed from consideration, and the overlap ratio would again go up for Project A and Project C to 4/5=80%. The overlap ratio, either directly or a weighted version thereof, may be utilized as a relevance score.

Various implementations have been specifically described. However, other implementations that include a fewer, or greater, number of features for each of the apparatuses, methods, or other embodiments described herein are also possible.

What is claimed is:

1. A system comprising:
a plurality of sensors installed in a predefined physical space, each of the sensors operable to sense a different parameter in the physical space and provide respective sensor signals;
a network interface configured to communicate with a database; and
an identification engine configured to:
monitor the respective sensor signals for a predetermined event that triggers an activity investigation for a possible presence of a plurality of people within the physical space;
correlate, during the activity investigation the respective sensor signals to detect an activity, by the plurality of people, is occurring within the physical space;
compare the respective sensors signals received during the detected activity of the plurality of people with predetermined patterns of the sensor signals to confirm that the activity is a relevant activity;
selectively activate a video camera, in response to the activity being confirmed as a relevant activity, to scan a layout of the physical space and from the layout perform facial recognition of the plurality of people within the physical space;
parse the database and identify a unique identity of respective people from among the plurality of people in the physical space who are engaged in the relevant activity, the unique identity of each of the respective people determined based on the facial recognition and identity information for the respective people stored in the database;
detect, based on the facial recognition, a plurality of distinct groupings of the plurality of people in the physical space who are engaged in the relevant activity;
identify, based on the unique identity of the respective people, that a distinct group from among the detected distinct groupings of the plurality of people in the physical space corresponds to a current project team;
parse the database and identify a plurality of projects assigned to project teams comprised of team members overlapping with the distinct group identified from among the detected distinct groupings of the respective people in the physical space;
select a candidate project from the plurality of projects based on a relevance score of the candidate project, determination of the relevance score comprising determined based on a confidence score of the unique identity of the respective people in the distinct group;
control a display device to display project content associated with the candidate project to the distinct group according to a location of the distinct group in the layout of the physical space; and
control adjustment of parameters in the physical environment in the physical space according to the candidate project and the location of the distinct group in the layout of the physical space, the parameters comprising at least one of temperature, lighting or media control.

2. The system of claim 1, wherein the plurality of sensors comprises one or more of a motion detection sensor configured to detect a movement in a space; a video recording device configured to record a digital video recording of the space; an audio recording device configured to record an audio recording of sounds from the space; or a sensor configured to detect a signal associated with a wearable device in the space.

3. The system of claim 1, wherein the identification engine is further configured to:
decrease a relevance score for a respective project from the plurality of projects when team members from the respective project do not match all the respective people depicted in space.

4. The system of claim 3, wherein the identification engine is further configured to:
parse the database and identify scheduled meetings for each of the plurality of projects; and
increase a relevance score for a respective project from the plurality of projects when an identified scheduled meeting overlaps with a time the plurality of people were detected in the space.

5. The system of claim 3, wherein the identification engine is further configured to:
parse the database and identify scheduled time off for team members assigned to each of the plurality of projects; and
increase a relevance score for a respective project from the plurality of projects when an identified scheduled time off accounts for a missing team member.

6. The system of claim 3, wherein the identification engine is further configured to:
parse the database and identify historical patterns of project meetings for each of the plurality of projects; and
increase a relevance score for a respective project from the plurality of projects when the identified historical patterns of project meetings overlaps with a time the plurality of people were detected in the space.

7. The system of claim 1, wherein the one or more sensors includes a video recording device configured to record a digital video recording of the space and a microphone configured to capture audio recording from the space; and
wherein the identification engine is configured to:
apply facial recognition on the digital video and/or apply voice recognition on the audio recording; and
parse the database and identify the respective people depicted in the space based on the facial recognition and/or based on the voice recognition.

8. The system of claim 1, wherein the identification engine is configured to determine the grouping of the plurality of people in the space corresponds to the current project team when a number of the respective people in the physical space who are identified as employees exceeds a predetermined threshold.

9. A method for identifying a project, the method comprising:
detecting, by a motion detection sensor, a movement in a physical space;
capturing, by a video capturing device, a digital video of the physical space;

recording, by an audio recording device, an audio recording of sounds from the physical space;

triggering an activity investigation for a possible presence of a plurality of people within the physical space based on the detecting, the capturing, the recording, or a combination thereof;

comparing the movement, the digital video and the audio recording to respective predetermined patterns to identify a relevant activity being performed by the plurality of people in the physical space;

selectively activating the video capturing device, in response to identification of the relevant activity, to capture a digital video depicting the plurality of people in the physical space engaged in the relevant activity;

communicating, by a network interface, with a database;

applying, by an identification engine, facial recognition on the digital video of the plurality of people in the physical space;

parsing, by the identification engine, the database and identifying a unique identity of respective people in the plurality of people depicted in the digital video based on the facial recognition;

detecting, by the identification engine, a predetermined arrangement of at least some of the respective people depicted in the digital video as being in a distinct grouping at a location within the physical space;

determining, by the identification engine, the distinct grouping of the at least some of the respective people depicted in the digital video correspond to a roster of team members of a current project team stored in the database;

parsing, by the identification engine, the database and identifying a plurality of projects assigned to project teams comprised of team members overlapping with a predetermined number of the at least some of the respective people depicted in the digital video as being in the distinct grouping;

selecting, by the identification engine, a candidate project from the plurality of projects based on a relevance score of the candidate project, the relevance score based at least partially on the unique identity of the at least some of the respective people depicted in the digital video as being in the distinct grouping;

decreasing a relevance score for a respective project from the plurality of projects when team members from the respective project do not match all the at least some of the respective people depicted in the digital video as being in the distinct grouping;

identifying, by the identification engine a display device in the vicinity of the location of the distinct grouping;

controlling, by the identification engine, the display device to display, to the distinct grouping, a project document associated with the candidate project; and controlling adjustment of a building system comprising at least one of temperature, lighting or media control in the physical environment of the physical space according to the candidate project and the location of the distinct grouping in the physical space.

10. The method of claim 9, wherein the database includes at least one of a schedule database, an employee database, a projects database, or a historical knowledge database.

11. The method of claim 9, further comprising:
parsing the database and identify scheduled meetings for each of the plurality of projects; and
increasing a relevance score for a respective project from the plurality of projects when an identified scheduled meeting for the respective project overlaps with a time the digital video was recorded.

12. The method of claim 9, further comprising:
parsing the database and identify scheduled time off for team members assigned to each of the plurality of projects; and
increasing a relevance score for a respective project from the plurality of projects when an identified scheduled time off accounts for a missing team member from the at least some of the respective people depicted in the digital video.

13. The method of claim 9, further comprising:
parsing the database and identify historical patterns of project meetings for each of the plurality of projects; and
increasing a relevance score for a respective project from the plurality of projects when the identified historical patterns of project meetings overlaps with a time the digital video was recorded.

14. The method of claim 9, wherein determining, by the identification engine, the at least some of the respective people depicted in the digital video correspond to a roster of a current project team stored in the database when a number of employees depicted in the digital video exceeds a predetermined threshold.

15. A product comprising:
a machine-readable medium other than a transitory signal; and
instructions stored on the machine-readable medium, the instructions configured to, when executed, cause a machine to:
execute an identification engine configured to:
receive a plurality of sensor signals from corresponding different sensors detecting environmental parameters in a physical space;
monitor the respective sensor signals for a predetermined event;
trigger an activity investigation for a possible presence of a plurality of people within the physical space in response to detection of the predetermined event;
correlate, during the activity investigation the respective sensor signals to detect an activity, by the plurality of people, is occurring within the physical space;
compare the respective sensors signals received during the detected activity of the plurality of people with predetermined patterns of the sensor signals to confirm that the activity is a relevant activity;
selectively activate, in response to the activity being confirmed as the relevant activity, a video camera to scan a layout of the physical space and generate a digital video of the plurality of people engaged in the relevant activity;
apply facial recognition on the digital video;
parse a database and identify a unique identity of each of a plurality of respective people depicted in the digital video based on the facial recognition;
detect an arrangement of people depicted in the digital video as a predetermined arrangement of people;
determine the predetermined arrangement of people depicted in the digital video correspond to a current project team based on the unique identity of each person in the predetermined arrangement of people depicted in the digital video;

parse the database and identify a plurality of projects assigned to project teams comprised of team members overlapping with a predetermined number of the predetermined arrangement of people depicted in the digital video;

select a candidate project from the plurality of projects based on a relevance score of the candidate project, the relevance score based at least partially on the unique identity of each person in the predetermined arrangement of people depicted in the digital video;

parse the database and identify scheduled meetings for each of the plurality of projects;

increase the relevance score of the candidate project when an identified scheduled meeting overlaps with a time the digital video was recorded;

identify a display device as being in a vicinity of a location of the predetermined arrangement of people depicted in the digital video;

control the display device to display a project document associated with the candidate project for the predetermined arrangement of people depicted in the digital video; and control operation of a building system to adjust at least one of lighting, temperature or media control in the physical space according to the candidate project and the location in the physical space of the predetermined arrangement of people depicted in the digital video.

16. The product of claim 15, where the instructions are further configured to cause the machine to:

decrease a relevance score for a respective project from the plurality of projects when team members from the respective project do not match the unique identity of each person in the predetermined arrangement of people depicted in the digital video.

17. The product of claim 15, where the instructions are further configured to cause the machine to:

increase a relevance score for a respective project from the plurality of projects when terminology included in speech detected by an audio sensor from a person in the predetermined arrangement of people depicted in the digital video is terminology stored in the database in association with the respective project, the audio sensor being one of the corresponding different sensors detecting environmental parameters in the physical space.

* * * * *